(12) United States Patent
Chapman et al.

(10) Patent No.: US 8,682,754 B1
(45) Date of Patent: *Mar. 25, 2014

(54) TRACKING CUSTOMER SPENDING AND INCOME

(75) Inventors: Michael Aaron Chapman, Chicago, IL (US); Hyun Jin Ko, Evanston, IL (US); Rodney Hal Monson, Waukegan, IL (US); Mark Alexander Jones, Evanston, IL (US); Bryan L. Mackrell, Pittsburgh, PA (US); Michael Ley, Moon Township, PA (US); Thomas Kunz, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 42 days.

This patent is subject to a terminal disclaimer.

(21) Appl. No.: 13/530,778

(22) Filed: Jun. 22, 2012

Related U.S. Application Data

(63) Continuation of application No. 12/152,074, filed on May 12, 2008, now Pat. No. 8,229,806.

(51) Int. Cl.
*G06Q 40/00* (2012.01)

(52) U.S. Cl.
USPC .......................................................... 705/30

(58) Field of Classification Search
None
See application file for complete search history.

(56) References Cited

U.S. PATENT DOCUMENTS

| | | |
|---|---|---|
| 4,367,402 A | 1/1983 | Giraud et al. |
| 4,443,027 A | 4/1984 | McNeely et al. |
| 4,837,422 A | 6/1989 | Dethloff et al. |
| 5,500,513 A | 3/1996 | Langhans et al. |
| 5,621,640 A | 4/1997 | Burke |
| 5,649,118 A | 7/1997 | Carlisle et al. |
| 5,845,260 A | 12/1998 | Nakano et al. |
| 5,953,710 A | 9/1999 | Fleming |
| 5,963,925 A | 10/1999 | Kolling et al. |
| 5,991,749 A | 11/1999 | Morrill, Jr. |
| 6,032,134 A | 2/2000 | Weissman |
| 6,052,675 A | 4/2000 | Checchio |
| 6,088,682 A | 7/2000 | Burke |
| 6,112,191 A | 8/2000 | Burke |
| 6,128,603 A | 10/2000 | Dent et al. |
| 6,173,269 B1 | 1/2001 | Solokl et al. |
| 6,353,811 B1 | 3/2002 | Weissman |

(Continued)

FOREIGN PATENT DOCUMENTS

| | | |
|---|---|---|
| WO | WO 96/34358 | 10/1996 |
| WO | WO 03/030054 | 4/2003 |

OTHER PUBLICATIONS

Moss, David A.; Johnson, Gibbs A.; The rise of consumer bankruptcy: Evolution, revolution, or both? American Bankruptcy Law Journal, v 73, n 2, p. 311-351, Spring 1999.

(Continued)

*Primary Examiner* — Shay S Glass
(74) *Attorney, Agent, or Firm* — Jonathan C. Parks, Esq.; Pietragallo Gordon Alfano Bosick & Raspanti, LLP

(57) ABSTRACT

Computer implemented methods of tracking customer spending and income are provided. The methods may comprise aggregating spending transactions by estimating income to a customer during a first time period. The methods may also comprise displaying a user interface to the customer. The user interface may comprise a first bar indicating customer income and a second bar indicating customer spending.

17 Claims, 5 Drawing Sheets

(56) References Cited

U.S. PATENT DOCUMENTS

| | | | |
|---|---|---|---|
| 6,411,938 | B1 | 6/2002 | Gates et al. |
| 6,493,685 | B1 | 12/2002 | Ensel et al. |
| 6,636,833 | B1 | 10/2003 | Flitcroft et al. |
| 6,742,704 | B2 | 6/2004 | Fitzmaurice et al. |
| 6,839,687 | B1 | 1/2005 | Dent et al. |
| 6,839,692 | B2 | 1/2005 | Carrott et al. |
| 6,876,971 | B1 | 4/2005 | Burke |
| 6,993,510 | B2 | 1/2006 | Guy et al. |
| 7,031,939 | B1 | 4/2006 | Gallagher et al. |
| 7,039,440 | B2 | 5/2006 | Rodriguez et al. |
| 7,076,465 | B1 | 7/2006 | Blagg et al. |
| 7,110,979 | B2 | 9/2006 | Tree |
| 7,146,338 | B2 | 12/2006 | Kight et al. |
| 7,147,149 | B2 | 12/2006 | Giraldin et al. |
| 7,171,370 | B2 | 1/2007 | Burke |
| 7,175,073 | B2 | 2/2007 | Kelley et al. |
| 7,249,092 | B2 | 7/2007 | Dunn et al. |
| 7,249,097 | B2 | 7/2007 | Hutchison et al. |
| 7,264,153 | B1 | 9/2007 | Burke |
| 7,328,839 | B2 | 2/2008 | Keohane et al. |
| 7,502,758 | B2 | 3/2009 | Burke |
| 7,536,351 | B2 | 5/2009 | Leblang et al. |
| 7,571,849 | B2 | 8/2009 | Burke |
| 8,065,230 | B1 | 11/2011 | Little |
| 8,229,806 | B1 * | 7/2012 | Chapman et al. ............... 705/30 |
| 8,401,938 | B1 | 3/2013 | Chapman et al. |
| 2001/0037315 | A1 | 11/2001 | Saliba et al. |
| 2001/0047310 | A1 | 11/2001 | Russell |
| 2002/0123949 | A1 | 9/2002 | VanLeeuwen |
| 2003/0028483 | A1 | 2/2003 | Sanders et al. |
| 2003/0050889 | A1 | 3/2003 | Burke |
| 2003/0083930 | A1 | 5/2003 | Burke |
| 2006/0122923 | A1 | 6/2006 | Burke |
| 2007/0005496 | A1 | 1/2007 | Cataline et al. |
| 2007/0034688 | A1 | 2/2007 | Burke |
| 2007/0061252 | A1 | 3/2007 | Burke |
| 2007/0061257 | A1 | 3/2007 | Neofytides et al. |
| 2007/0083465 | A1 | 4/2007 | Ciurea et al. |
| 2007/0094130 | A1 | 4/2007 | Burke |
| 2007/0100749 | A1 | 5/2007 | Bachu et al. |
| 2007/0162387 | A1 | 7/2007 | Cataline et al. |
| 2007/0214162 | A1 | 9/2007 | Rice |
| 2007/0239572 | A1 | 10/2007 | Harris et al. |
| 2008/0120129 | A1 | 5/2008 | Seubert et al. |
| 2009/0204538 | A1 | 8/2009 | Ley et al. |

OTHER PUBLICATIONS

The Tech Scene: Aggregation Sites Letting Users Compare Spending American Banker—May 2, 2008; p. 21; vol. 173, No. 85.
Ronald Lipman, "Adding family to credit card not always wise," Houston Chronicle, dated Jan. 18, 2008, printed from chron.com, 2 pages.
Lawrence Kutner, "Parent & Child," The New York Times, dated Aug. 19, 1993, printed from http://www.nytimes.com/1993/08/19/garden/parent-child.html?pagewanted=print, Internet site accessed on Feb. 1, 2008, 3 pages.
Jane J. Kim, "Managing Your Money in Public View," The Wall Street Journal, dated Jun. 14, 2007, printed from http://online.wsj.com/article/SB118177906703834565.html, Internet site, accessed on Apr. 11, 2008, 5 pages.
"Obopay—Money Transfer by Cell Phone or Web," printed from https://www.obopay.com/consumer/GetHelp.do?target=HelpHowWorks, Internet site, accessed on Apr. 11, 2008, 4 pages.
"BillMonk.com," printed from https://www.billmonk.com/about/tour, Internet site, accessed on Apr. 11, 2008, 8 pages.
"Split It by TD Canada Trust Facebook," printed from http://www.facebook.com/apps/application.php?id=4245957541&ref=nf, Internet site, accessed on Apr. 11, 2008, 2 pages.
"ING Direct Electric Orange Checking Account," printed from http://banking.about.com/od/checkingaccounts/p/ingchecking.htm Internet site, accessed on Apr. 11, 2008, 1 page.
"Know your financial health—at a glance!" printed from http://www.buxfer.com/tour.php?id=HomePage, Internet site, accessed on Apr. 11, 2008, 1 page.
"Use Buxfer's analytics to understand your finances," printed from http://www.buxfer.com/tour.php?id=Analytics, Internet site, accessed on Apr. 11, 2008, 1 page.
"Use Buxfer Groups to simplify shared finances," printed from http://www.buxfer.com/tour.php?id=Groups, Internet site, accessed on Apr. 11, 2008, 1 page.
"Report transactions easily; let Buxfer deal with the math," printed from http://www.buxfer.com/tour.php?id=Reporting, Internet site, accessed on Apr. 11, 2008, 1 page.
"Import statements from banks or credit card accounts," printed from http://www.buxfer.com/tour.php?id=Import, Internet site, accessed on Apr. 11, 2008, 1 page.
"Slice and dice through your transactions," printed from http://www.buxfer.com/tour.php?=Filters, Internet site, accessed on Apr. 11, 2008, 1 page.
"Transfer money online with Amazon Payments," printed from http://www.buxfer.com/tour.php?id=Send money, Internet site, accessed on Apr. 11, 2008, 1 page.
"Setup budgets to control your expenses," printed from http://www.buxfer.com/tour.php?id=Budgets, Internet site, accessed on Apr. 11, 2008, 1 page.
"Access Buxfer while on the move!" printed from http://www.buxfer.com/tour.php?id=Mobile, Internet site, accessed on Apr. 11, 2008, 1 page.
"Take Buxfer with you on the Internet everywhere!" printed from http://www.buxfer.com/tour.php?id=Gadgets, Internet site, accessed on Apr. 11, 2008, 1 page.
"Amazon Payments Account Management," printed from https://payments.amazon.com/sdui/sdui/paymentabout?about=true, Internet site, accessed on Apr. 11, 2008, 1 page.
"Living with a Roommate in Memphis," memphis apartments tv.com, dated Feb. 15, 2007, printed from http://www.memphisapartmentstv.com/living-with-a-roommate-in-memphis/, Internet site, accessed on Sep. 18, 2007, 2 pages.
"Billshare—a simple app for people who share bills," printed from http://billshare.org/, Internet site, accessed on Sep. 18, 2007, 2 pages.
"Get More from Your PayPal Account," printed from https://www.paypal.com/us/cgi-bin/webscr?cmd=xpt/cps/general/AccountOverv- iew-outside, Internet site, accessed on Sep. 18, 2007, 2 pages.
"How PayPay Works—PayPal," printed from https://www.paypal.com/us/cgi-bin/webscr?cmd=xpt/cps/general/NewConsumerWorks-outside, Internet site, accessed on Sep. 18, 2007, 3 pages.
"Sending Money Person-to-Person is Easy," printed from https://www.paypal.com/us/cgi-bin/webscr?cmd=xpt/cps/general/PersonPaymen- ts-outside, Internet site, accessed on Sep. 18, 2007, 1 page.
"Track Your Online Spending," printed from https://www.paypal.com/us/cgi-bin/webscr?cmd=xpt/cps/general/TrackingMoney-outside, Internet site, accessed on Sep. 18, 2007, 2 pages.
"Enter Details—PayPal," printed from https://www.paypal.com/us/cgi-bin/webscr?cmd=flow&SESSION=6paX9BKc4FK4EJ8, Internet site, accessed on Sep. 18, 2007.
"Review Payment Details—PayPal," printed from https://www.paypal.com/us/cgi-bin/webscr?cmd=.sub.--flow&SESSION=RMXX7KRm- InYnF, Internet site, accessed on Sep. 18, 2007, 1 page.
"Savings Plan," printed from http://quicken.intuit.com/images/screenshots/ss.sub.--savings.sub.--plan.- sub.--lrg.gif, Internet site, accessed on Mar. 19, 2008, 1 page.
"Quicken Deluxe 2008," printed from http://quicken.intuit.com/personal-finance/deluxe-money-management.jhtml, Internet site, accessed on Mar. 19, 2008, 7 pages.
"SMS Banking," brochure by Acette Technologies FZ LLC, dated 2007, 3 pages.
Tim Ferguson, "Mobile banking rolled out by HSBC," dated Oct. 4, 2006, printed from http://www.silicon.com/financialservices/0,3800010322,39162983,00.htm, Internet site, accessed on Oct. 11, 2007, 2 pages.

(56) References Cited

OTHER PUBLICATIONS

Julian Goldsmith, "Cashing in on the ATM revolution," dated May 2, 2007, printed from http://www.silicon.com/financialservices/0,3800010322,39166938,00.htm, Internet site, accessed on Oct. 11, 2007, 3 pages.
Shelley Elmblad, "Online Banking is Easy on Budgets," dated May 22, 2007, printed from http://building-personal-savings.suite101.com/article.cfm/online.sub.--ba- nking.sub.--get.sub.--the.sub.--facts, Internet site, accessed on Oct. 12, 2007, 2 pages.
John R. Quain, "Cellphone Banking Is Coming of Age," dated May 24, 2007, printed from http://www.nytimes.com/2007/05/24/technology/24basics.html?.sub.--r=1&ore- f=slogin, Internet site, accessed on Oct. 12, 2007, 4 pages.
"Ducont—Mobile Payments," printed from http://www.ducont.com/Products/bnf.sub.--mdhm.htm, Internet site, accessed on Oct. 11, 2007, 1 page.
"Ducont—Bank.companion," printed from http://www.ducont.com/Products/bnf.sub.--bankcomp.htm, Internet site, accessed on Oct. 11, 2007, 1 page.
"MyCheckFree.com," printed from https://mycheckfree.com/br/wps?sp=10001&rq=bfbl, Internet site, accessed on Sep. 14, 2007, 1 page.
"About CheckFree," printed from https://mycheckfree.com/br/wps?rq=login&slpg=Y&file=authentication/login.- sub.--baseline.sub.--about-checkfree&esc=93096239&sp=, Internet site, accessed on Sep. 14, 2007, 1 page.
"MyCheckFree—Frequently Asked Questions," printed from https://mycheckfree.com/br/wps?rq=login&slpg=Y&file=authentication/login.- sub.--baseline.sub.--faq&esc=93096239&sp=10001, Internet site, accessed on Sep. 14, 2007, 5 pages.
"Paytrust: Paying Bills Has Never Been Easier," printed from http://www.paytrust.com/learnmore.shtml, Internet site, accessed on Sep. 14, 2007, 2 pages.
"Why Use Paytrust.RTM. Instead of a Traditional Bill-Pay Service?" printed from http://www.paytrust.com/morethanbillpay.shtml, Internet site, accessed on Sep. 14, 2007, 3 pages.
"Paytrust: Frequently Asked Questions," printed from http://www.paytrust.com/commonquestions.shtml Internet site, accessed on Sep. 14, 2007, 5 pages.
Richard Irons, "What is Envelope Budgeting—Why the Envelope Budgeting System is so Effective?" printed from http://www.mvelopes.com/articles/envelope-budgeting.php, Internet site, 2 pages.
"Pocket Quicken," printed from http://www.landware.com/pocketquicken, Internet site, accessed on Sep. 14, 2007, 2 pages.
"Mobile Quicken.TM.—Stand Alone or Connect with a Click," printed from http://www.landware.com/pocketquicken/moreinfo.html, Internet site, accessed on Sep. 14, 2007, 4 pages.
"UnitedOne Credit Union," printed from http://www.unitedone.org/ASP/home.asp, Internet site, accessed on Sep. 14, 2007, 3 pages.
"UnitedOne Credit Union—Calendar Help," printed from https://s146.lanxtra.com/servlet/EchoTemplateServlet?template=/2/en/IBHel- p.vm&help=10901, Internet site, accessed on Sep. 14, 2007, 5 pages.
"Quicken Starter Edition 2008," printed from http://quicken.intuit.com/personal-finance/starter-edition-personal-budget.jhtml, Internet site, accessed on Sep. 14, 2007, 5 pages.
"Jul. 2007 calendar," printed from http://quicken.intuit.com/images/screenshots/ss.sub.--calendar.sub.--lrg.- gif, Internet site, accessed on Sep. 14, 2007, 1 page.
"Navigator," dated Jul. 2006, printed from www.pscu.org, Internet site accessed on Oct. 17, 2007, 2 pages.
"Bank of America Privacy Assist Premier.TM.—Protect your credit and identity," printed from http://www.bankofamerica.com/pap/index.cfm?template=pap.sub.--assist.sub.- --premier, Internet site, accessed on Oct. 17, 2007, 2 pages.
"Identity Theft Protection—Bank of America Privacy Assist Premier.TM.," printed from http://www.bankofamerica.com/pap/index.cfm?template=pap.sub.--assist.sub.- --premier, Internet site, accessed on Oct. 17, 2007, 2 pages.
"Bank of America—Online Bill Pay and e-Bills Frequently Asked Questions," printed from http://www.bankofamerica.com/onlinebanking/index.cfm?template=faq.sub.--b- illpay, Internet site, accessed on 10/17/207, 2 pages.
"Technology Credit Union," printed from http://www.techcu.com/resources/about.sub.--tech.sub.--cu/privacy/online.htm, Internet site, accessed on Oct. 17, 2007, 1 page.
"Billshare.org—Make Bill Paying with Roomies Easy—KillerStartups,com," printed from http://www.killerstartups.com/Web20/billshare--Make-Bill-Paying-with-Room- ies-Easy/, Internet site, accessed on Sep. 18, 2007, 4 pages.
Every Penny Counts, Inc., Patent Property Due Diligence Chart, prepared Aug. 30, 2007, 8 pages.
U.S. Appl. No. 12/152,028, filed May 12, 2008.
U.S. Appl. No. 12/120,995, filed May 15, 2008.
U.S. Appl. No. 12/479,378, filed Jun. 5, 2009.
Office Action dated Apr. 2, 2009 for U.S. Appl. No. 12/152,028, filed May 12, 2008.
Office Action dated Sep. 16, 2009 for U.S. Appl. No. 12/152,028, filed May 12, 2008.

\* cited by examiner

TRACKING CUSTOMER SPENDING AND INCOME

The present application claims priority to U.S. application Ser. No. 12/152,074, now U.S. Pat. No. 8,229,806, issued on Jul. 24, 2012.

BACKGROUND

Banking institutions frequently offer Internet banking products and services to their customers as an alternative to traditional "brick and mortar" banking channels. Such products and services are typically provided via a user interface (UI) of a secure banking Web site that is hosted by the bank and that is remotely accessible by its customers using, for example, a personal computer (PC), automated teller machine (ATM) or other network-enabled device. Products and services that may be offered to Internet banking customers include, for example, account balance inquiries, electronic funds transfers, transaction information downloads, bill presentment and payment, loan applications, and investment services.

Existing products allow customers to make inquiries about their account balances and view transaction information, however, they do not provide a clear and convenient way to convey to a customer the relationship between their income and their spending.

FIGURES

DESCRIPTION

Various embodiments may be directed to products for displaying a customer's spending versus the customer's income. The products may include a user interface that may be displayed to the customer. The user interface may provide an indication of spending versus income for one or a plurality of time periods (e.g., weeks, months, years, etc.). For example, the user interface may comprise an income bar and a spending bar. The income bar may have a dimension (e.g., height, width, etc.) that is proportional to income that has been received by the customer during a first time period. In some embodiments, the income bar may also reflect amounts that the customer expects to receive during the time period. The spending bar may have a dimension that is proportional to an amount that the customer has spent during the first time period. In some embodiments, the spending bar may also consider planned future spending. The spending bar and the income bar may be proportional to one another such that the relative difference between the two indicates a relative difference between the customer's spending and income.

According to various embodiments, the user interface may display multiple income and spending bar pairs simultaneously. For example, each pair may correspond to a different time period. A first pair may correspond to a current week, a second pair may correspond to a current month and a third pair may correspond to a current year. Also, in some embodiments the user interface may include one or more spending and income bar pairs corresponding to historical time periods.

Figure 1:
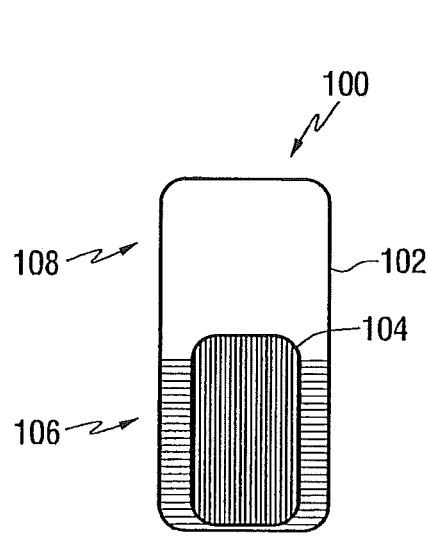
FIG. 1 illustrates one embodiment of a user interface for displaying customer spending and income.
Figure 2:
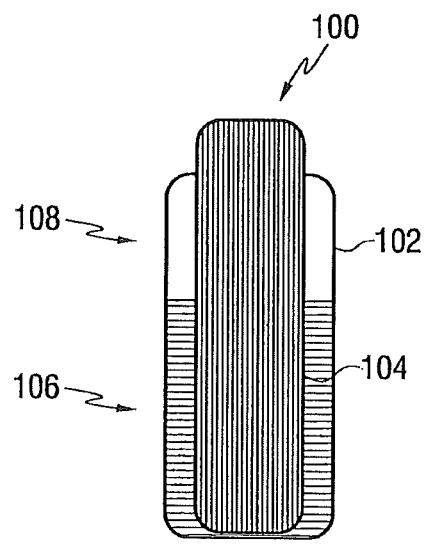
FIG. 2 illustrates one embodiment of the user interface of FIG. 1 with a spending bar higher than an income bar, indicating that the customer has spent more than their total income for the time period.

FIG. 1 illustrates one embodiment of a user interface 100 for displaying customer spending and income for a single time period. The user interface 100 comprises an income bar 102 and a spending bar 104, which may show the relative relationship between the customer's income and spending over the time period. For example, in FIG. 1, the spending bar 104 is lower than the income bar 102, indicating that the customer has spent less than their total income for the time period. FIG. 2, however, illustrates one embodiment of the user interface 100 with the spending bar 104 higher than the income bar 102, indicating that the customer has spent more than their total income for the time period. According to various embodiments, the bars 102, 104 may be positioned within one another, as shown. For example, the spending bar may be positioned within the income bar 102.

To show the relationship between income and spending, the income bar 102 and spending bar 104 may have vertical dimensions proportional to the customer's income and spending, respectively. For example, the income bar 102 may have a vertical dimension proportional to an estimated amount of income to the customer during the time period. The spending bar 104 may have a vertical dimension proportional to an amount spent by the customer during the time period. Although FIG. 1 shows the bars 102, 104 proportional to income and spending along the vertical dimension, various other embodiments may include bars proportional to income and spending along other dimensions including, for example, the horizontal dimension. According to various embodiments, the proportion of the income bar 102 height to estimated income and the proportion of the spending bar 104 height to spending may be the same. Also, in some embodiments, the height of the income bar 102 may be fixed.

According to various embodiments, the income bar 102 may be divided along the vertical dimension into a present income portion 106 and a future income portion 108. The present income portion 106 may represent the portion of the total expected income that has been deposited into a financial account of the customer. The future income portion 108 may represent the portion of the total expected income that is expected to be deposited into the financial account of the customer before the expiration of the time period. The present and future income may be found according to any suitable methods. For example, present and future income may be found by a pro rata division of the total estimated income to the customer during the time period. In this way, if the time period is one month, and two weeks of the month have elapsed, the present income and the future income may both be equal to half of the total estimated income for the time period. In another example, the present income may be equal to, or related to, actual deposits made into the customer's financial account. Future income may, then, be equal to the sum of other expected deposits during the time period.

Figure 3:
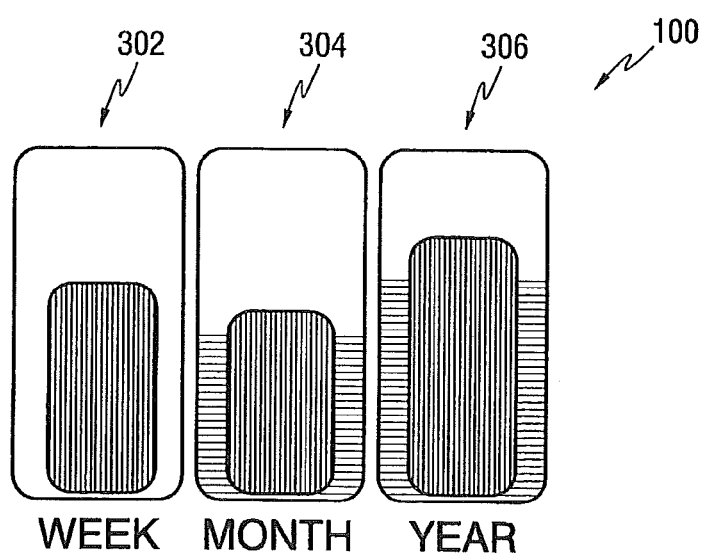
FIG. 3 illustrates one embodiment of the user interface of FIG. 1 having three sets of bars.

According to various embodiments, the interface 100 may include multiple sets of bars 102, 104, with each set of bars having a different associated time period. For example, FIG. 3 illustrates one embodiment of the user interface 100 having three sets of bars 302, 304, 306. According to various embodiments, the time periods of the bar sets 302, 304, 306 may be subsumed within one another. For example, as shown, the bar set 306 has a time period of a year; bar set 304 has a time period of a month; and bar set 302 has a time period of a week. The week may be a part of the month, which may, in turn, be a part of the year.

Figure 4:
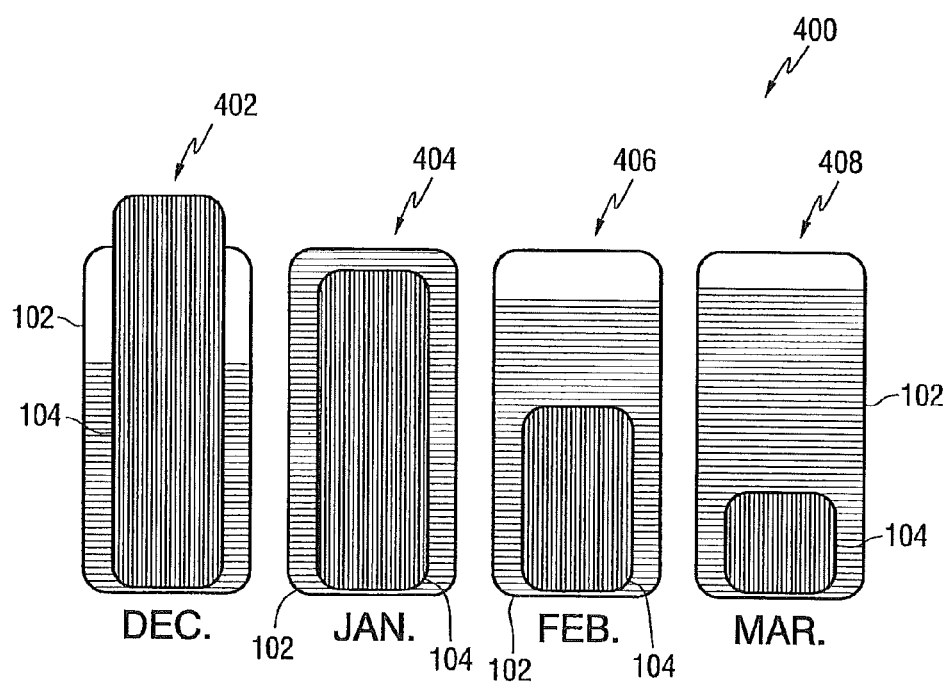
FIG. 4 illustrates one embodiment of a user interface including bar sets showing historical spending and income information for the customer.

FIG. 4 illustrates one embodiment of a user interface 400 including bar sets 402, 404, 406, 408 showing historical spending and income information for the customer. For example, each of the bar sets 402, 404, 406, 408 may include an income bar 102 and a spending bar 104, as described above. The time periods associated with one or more of the bars 402, 404, 406, 408 may be historical time periods that have elapsed. For example, each of the bar sets 402, 404, 406, 408 is associated with a past month. In this way, a customer may be able to view their historical spending versus income data.

Figure 5:
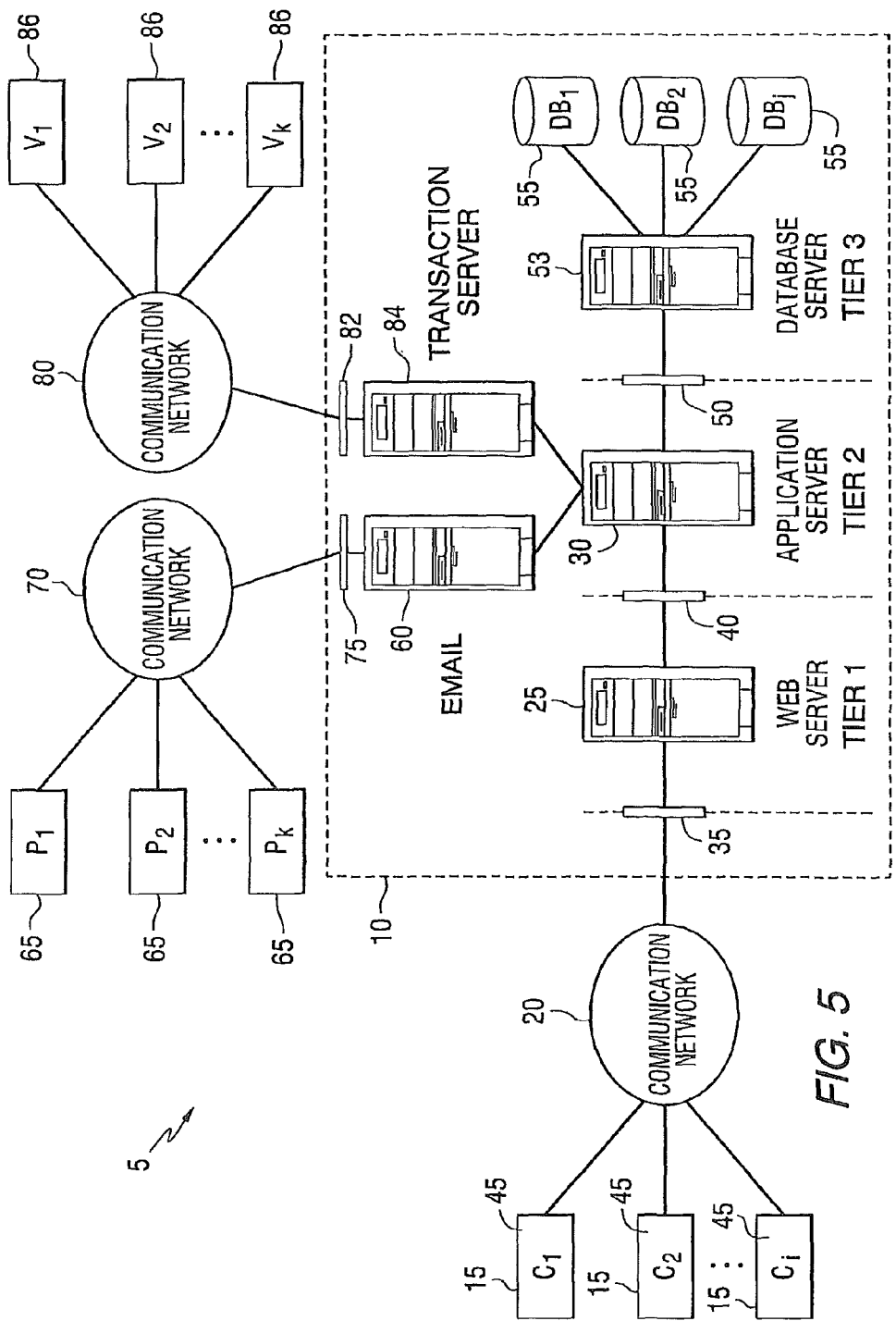
FIG. 5 illustrates one embodiment of a system, which may be implemented by a financial institution to provide network-based banking products for its customers, including, for example, the user interfaces shown above.

FIG. 5 illustrates one embodiment of a system 5, which may be implemented by a financial institution to provide network-based banking products for its customers, including, for example, the user interfaces shown above. Other examples of banking products provided by the system may include, for example, bill payment, customer purchases, monetary transfers between accounts and between parties, etc. As shown, the system 5 may include a host system 10 in communication with one or more client devices 15 (hereinafter "clients") via a communication network 20. Each client 15 may be associated with one or more customers of the financial institution and may allow the customers to access the network-based banking products. The network 20 may be any suitable wired or wireless, public or private communications network suitable for enabling the exchange of information between the host system 10 and the clients 15. For example, the network 20 may be partially or completely comprised of one or more of the Internet, a Public Switched Telephone Network (PSTN), a cellular or mobile telephone network, etc.

The host system 10 may be constructed and arranged with any suitable combination of components. For example, according to various embodiments, the host system 10 may be arranged in a tiered network architecture and include a Web server 25, an application server 30, and a database server 35. The Web server 25 may correspond to a first tier of the host system 10 and may communicate with the communication network 20 (e.g., the Internet) and the application server 30 via a border firewall 35 and an application firewall 40, respectively. The Web server 25 may be configured to accept requests from one or more of the clients 15 via the communication network 20 and provide responses. The requests and responses may be formatted according to Hypertext Transfer Protocol (HTTP) or any other suitable format. The responses may include, for example, static and/or dynamic documents for providing an Internet banking user interface (UI) 45 to customers via the clients 15. For example, the banking UI 45 may include the interface 100 and/or the interface 400 described above. The documents may be formatted according to the Hypertext Markup Language (HTML) or any other suitable format. The Web server 25 may further be configured to authenticate each customer's credentials before allowing access to the UI 45 and other banking resources. Such authentication may be performed, for example, using a user name and a password. Additional security measures may be utilized in the authentication process if desired.

A second tier of the host system 10 may comprise an application server 30. The application server 30 may communicate with the Web server 25 and the database server 35 (e.g., Tier 3) via the application firewall 40 and an internal firewall 50, respectively. The application server 30 may host one or more Internet banking applications for executing the business logic associated with Internet banking features of the UI 45. The application server 30 may receive customer-entered information from the UI 45 of each client 15 via the Web server 25. Such information may include, for example, a user name and password, customer requests to access particular Internet banking features, etc. Based on this and other information received from the clients 15 via the Web server 25, the application server 30 may perform transactions (e.g., transfer funds between accounts, retrieve account balances, transfer amounts to other customer, etc.) and generate corresponding informational content (e.g., transfer confirmations, account balance information, etc.). Information regarding such transactions may be communicated to the Web server 25 and subsequently presented to the customers using, for example, a dynamic Web page of the UI 45.

The third tier of the host system 10 may comprise a database server 35, which may communicate with the application server 30 via the internal firewall 50. The database server 35 may manage one or more databases 55 containing data necessary for supporting one or more Internet banking features. Such databases may include, for example, an account information database, a customer information database, a customer preferences/settings database, as well as other databases for storing additional settings and/or configurations. Such information may be retrieved, processed and updated as needed by the application server 30 based on the particular Internet banking features(s) being used.

The clients 15 may include any suitable network-enabled devices such as, for example, personal computers (PC's), automated teller machines (ATM's), palmtop computers, mobile phones, etc. The clients 15 may be configured to transmit and receive information via the communication network 20 using a wired or wireless connection, and may include a suitable browser software application including, for example, MICROSOFT INTERNET EXPLORER, MICROSOFT INTERNET EXPLORER MOBILE, MOZILLA FIREFOX, PALM BLAZER, etc.) for enabling the customer to display, enter and interact with information exchanged via the communication network 20. The clients 15 may thus access and navigate static and/or dynamic HTML documents of the Internet banking UI 45.

The host system 10 may further include an e-mail server 60 in communication with the application server 30 for enabling the exchange of electronic communications between clients 15 and one more parties 65 externally located with respect to the host system 10. Electronic communications may be exchanged between the e-mail server 60 and the parties 65 via a communication network 70. Although the communication network 70 is depicted separately from the communication network 20 in FIG. 1, it will be appreciated that the communication networks 20, 70 may be implemented using a common communication network (e.g., the Internet, the PSTN, a cellular or other mobile network, or combinations thereof). According to various embodiments, the e-mail server 60 and/ or the application server 30 may implement an account for some or all of the customers associated with parties 65 or clients 15. Each customer's account may be accessible by the customer and may include communications directed to the customer including, for example, electronic bills, transfer requests, etc. In certain embodiments and as shown in FIG. 1, the host system 10 may include an e-mail firewall 75 disposed between the e-mail server 60 and the communication network. The e-mail server 60 may implement an e-mail server application for handling the transfer of electronic communications to and from other e-mail servers and e-mail clients (e.g., clients 45 and parties 65) using any suitable e-mail protocols and standards.

Generally, a party 65 may be any person or entity with whom a client 15 desires to communicate regarding specific aspects of his finances or financial matters generally. As discussed above, such parties may include, for example, billing parties (e.g., utility companies, credit card companies, etc.). Billing parties may present to the host system 10 electronic bills payable by customers associated with clients 15. The electronic bills may be posted to a customer's account, allowing the customer to pay the bills with a transfer from a financial account. A financial account may be any type of account held by a customer at a financial institution where the financial institution keeps funds of the customer (e.g., a checking account, a savings account, an investment account, etc.). According to various embodiments, parties 65 may also be non-billing parties who have an ongoing financial relationship with a customer (e.g., roommates or business partners of other customers or other parties who have need to communicate with customers utilizing clients 15).

According to various embodiments, the host system 10 may also comprise a transaction server 84 in communication with the application server 30. The transaction server 84 may enable transactions between customers and vendors 86. For example, the transaction server 84 may implement functionality allowing customers to remit payment to one of the vendors 86 directly from one of their financial accounts. Such transactions may be referred to as debit transactions. Debit transactions may be communicated from the vendors 86 to the transaction server 84 via communication network 80. Again, although the network 80 is depicted separately from networks 70 and 20, the networks 70, 20, and 80 may be implemented utilizing a common communication network such as, for example, the Internet, the PSTN, a cellular or other mobile network, etc. In various embodiments, however, the network 80 may be implemented as a secure proprietary network (e.g., a network implemented by VISA, MASTERCARD or other similar transaction companies). As shown in FIG. 1, a transaction firewall 82 may be present between the transaction server 84 and the communication network 80.

Customers may remit payment to a vendor 86, for example, by producing to the vendor 86 a debit card, check card or other proof of their financial account at the financial institution implementing the system 10. This may be accomplished in person or, according to various embodiments, over the Internet. The customer may authorize a debit transaction in any suitable way including, for example, providing a signature, providing a personal identification number (PIN), etc. When a debit transaction is authorized, the vendor 86 may generate a request for payment, which is communicated to the transaction server 84 via the communication network 80. When a request for payment is received from a vendor 86, the transaction server 84 and/or the application server 30 may take appropriate steps to remit payment to the vendor 86 from a financial account (e.g., a checking account) of the customer. For example, a hold may be initially placed on funds in the customer's financial account equal to the amount of the request for payment. The amount may be subsequently transferred to an account of the vendor 86 according to any suitable methods.

Figure 6:
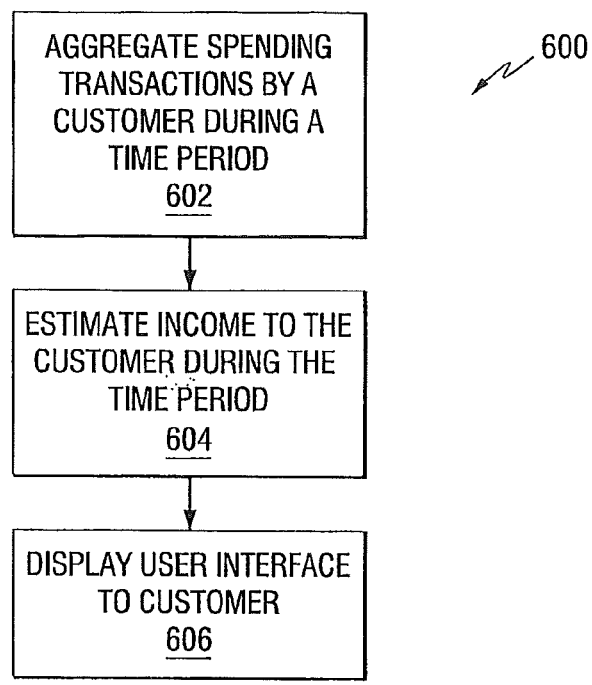
FIG. 6 illustrates one embodiment of a flow chart that may be executed by the system of FIG. 5 to display spending and income to a customer.

According to various embodiments, the system 10 may be used to provide customers with the user interfaces 45, 100, 400 described herein. FIG. 6 illustrates one embodiment of a flow chart 600 that may be executed by the system 10 to display spending and income to a customer. The process flow 600 may be executed by any suitable component or components of the system 10 including, for example, the application server 30. At box 602, the system 10 may aggregate spending transactions by the customer during a time period. The spending transactions may include debit transactions made by the customers, checks drawn on a financial account of the customer, etc. According to various embodiments, the spending transactions may also include scheduled bill payments that are in the future, but still within the time period.

At box 604, the system 10 may estimate income to the customer during the time period. Income may be estimated according to any suitable method. For example, the system 10 may track historical deposits (e.g., direct deposits of paychecks) to the customer's financial account and estimate periodic income accordingly. According to various embodiments, the system 10 may receive from the customer a periodic income amount. From this value, the system 10 may derive the customer's income for any suitable period. As described above, estimating income may comprise finding a present income and a future income, which may be found in any suitable way including, for example, those described above. According to various embodiments, estimating income to the customer may comprise excluding income that is earmarked for one or more investment accounts. For example, the customer may have his or her financial accounts set up such that a portion of one or more paychecks is deposited into an investment account (e.g., a retirement account, a savings account, etc.). These amounts may or may not be excluded from estimated income.

Figures 7, 8:
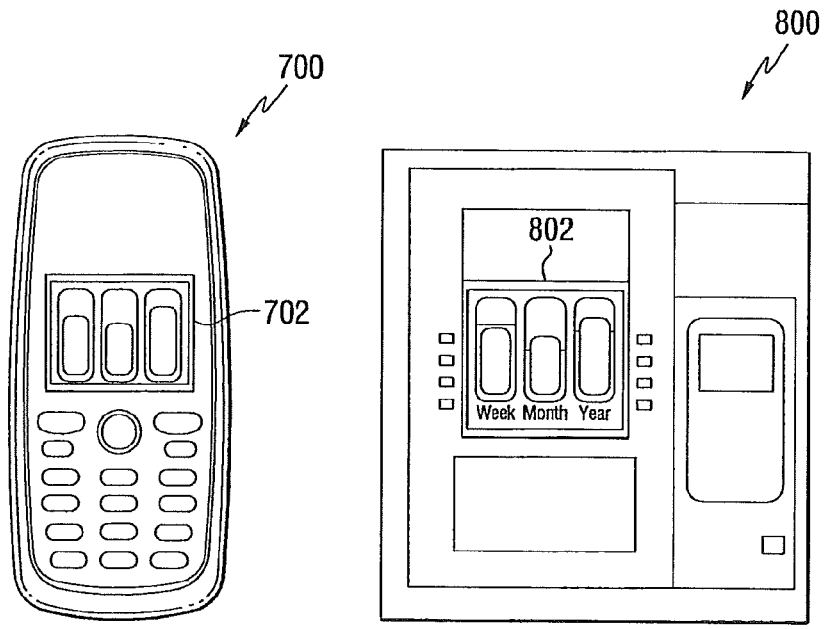
FIG. 7 illustrates one embodiment of a mobile phone or palmtop computer displaying a user interface.
FIG. 8 illustrates one embodiment of an automated teller machine (ATM) displaying a user interface according to various embodiments.
Figure 9:
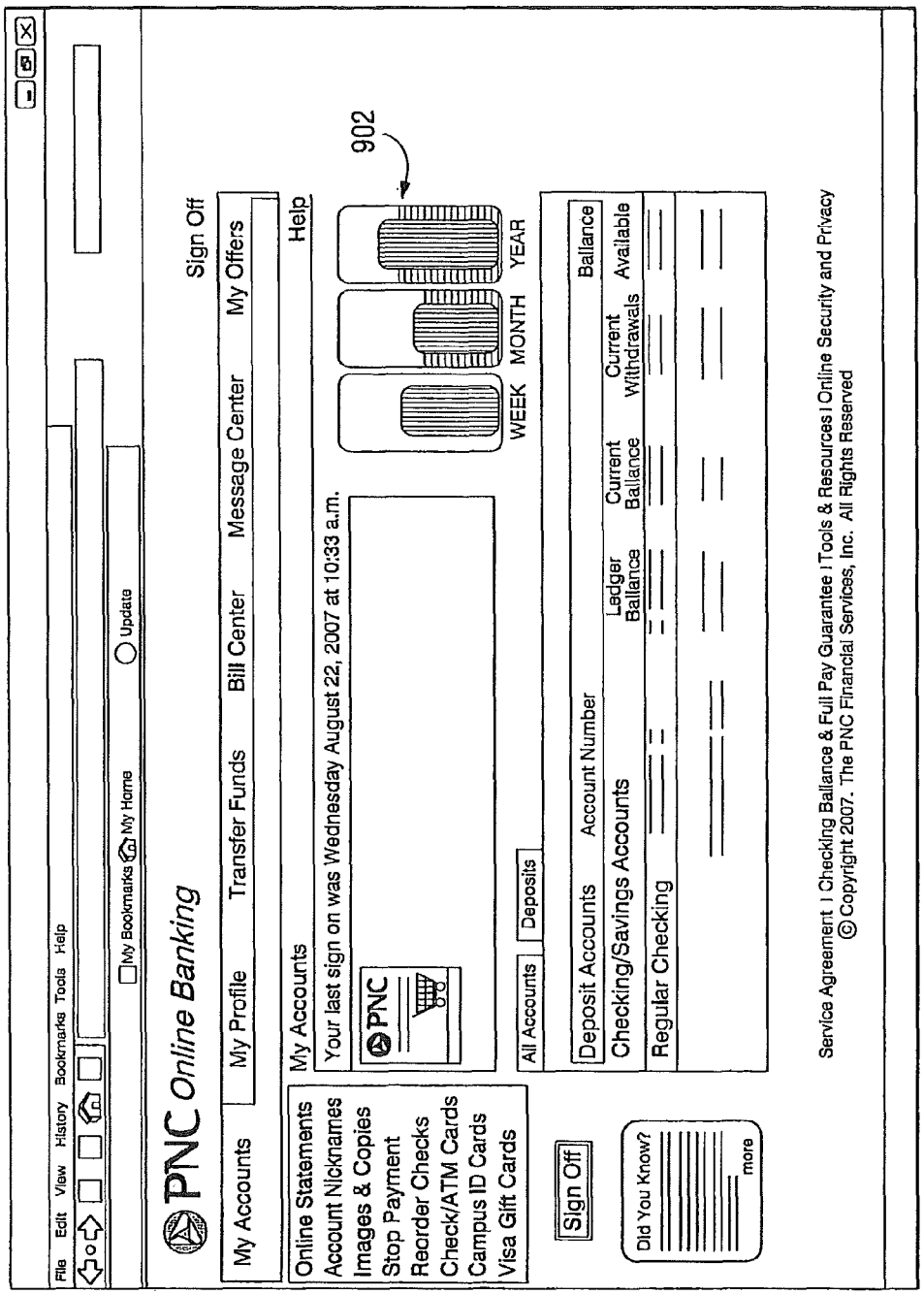
FIG. 9 illustrates a screen including one embodiment of a user interface.

At box 606, the system 10 may provide a user interface to the customer displaying income versus spending information. For example, the system may provide one or more of the interfaces 100, 400 described herein. According to various embodiments, the user interface may be provided to one or more clients 15 over the communication network 20. For example, FIG. 7 illustrates one embodiment of a mobile phone or palmtop computer 700 displaying a user interface 702 according to various embodiments. FIG. 8 illustrates one embodiment of an automated teller machine (ATM) 800 displaying a user interface 802 according to various embodiments. Also, FIG. 9 illustrates a screen 900 including one embodiment of a user interface 902. The screen 900 may be displayed on a client 15, such as a personal computer.

As used herein, a "computer" or "computer system" may be, for example and without limitation, either alone or in combination, a personal computer (PC), server-based computer, main frame, server, microcomputer, minicomputer, laptop, personal data assistant (PDA), mobile phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary.

While several embodiments of the invention have been described, it should be apparent that various modifications, alterations and adaptations to those embodiments may occur to persons skilled in the art with the attainment of some or all of the advantages of the present invention. For example, although income and spending bars are described, it will be appreciated that any other suitable shape or pattern may be substituted (e.g., a line, a dashed line, a circle, etc.). The present disclosure is therefore intended to cover all such modifications, alterations and adaptations without departing from the scope and spirit of the present invention as set forth in the appended claims.

We claim:

1. A computer implemented method of tracking customer spending and income, the method comprising:
   aggregating spending transactions by a customer during a first time period;
   estimating income to the customer during the first time period; and
   displaying a user interface to the customer, wherein the user interface comprises:
      a first bar, wherein a dimension of the first bar is proportional to the estimated income to the customer during the first time period; and
      a second bar, wherein a dimension of the second bar is proportional to the aggregate spending transactions by the customer during the first time period, wherein the second bar is positioned within the first bar, and wherein the dimension of the first bar is parallel to the dimension of the second bar.

2. The method of claim 1, further comprising:
   aggregating spending transactions by the customer during a second time period;
   estimating income to the customer during the second time period; and
   wherein the user interface further comprises:
      a third bar, wherein a dimension of the third bar is proportional to the estimated income to the customer during the second time period; and
      a fourth bar, wherein a dimension of the fourth bar is proportional to the aggregate spending transactions by the customer during the second time period, wherein the third bar is positioned within the fourth bar, and wherein the dimension of the third bar is parallel to the dimension of the fourth bar.

3. The method of claim 2, wherein the second time period is subsumed within the first time period.

4. The method of claim 2, further comprising:
   aggregating spending transactions by the customer during a third time period;
   estimating income to the customer during the third time period; and
   wherein the user interface further comprises:
      a fifth bar, wherein a dimension of the fifth bar is proportional to the estimated income to the customer during the third time period; and
      a sixth bar, wherein a dimension of the sixth bar is proportional to the aggregate spending transactions by the customer during the third time period, wherein the fifth bar is positioned within the sixth bar, and wherein the dimension of the fifth bar is parallel to the dimension of the sixth bar.

5. The method of claim 4, wherein the first time period is a present week, the second time period is a present month, and the third time period is a present year.

6. The method of claim 1, wherein the first time period is selected from the group consisting of a week, a month and a year.

7. The method of claim 1, wherein the first bar is divided along the dimension of the first bar into a first portion and a second portion, wherein the first portion is proportional to a present income of the customer, and wherein the second bar is proportional to a future income of the customer.

8. The method of claim 7, wherein the present income is a pro rata portion of the estimated income based on the amount of the first time period that has elapsed.

9. The method of claim 7, wherein the present income is equal to deposits received into a financial account of the customer, and the future income is equal to the sum of deposits expected to be received into the financial account of the customer before the expiration of the time period.

10. The method of claim 1, wherein estimating income to the customer during the first time period comprises receiving from the customer an income amount.

11. The method of claim 1, wherein estimating income to the customer during the first time period comprises:
   aggregating income received to a first financial account of the customer during the first time period; and
   estimating income that will be received to the first financial account of the customer during the first time period considering income received to the first financial account of the customer during at least one previous time period.

12. The method of claim 11, further comprising excluding from the estimated income amounts to be transferred to an investment account.

13. The method of claim 1, wherein displaying the user interface to the customer comprises displaying the user interface to at least one device selected from the group consisting of a personal computer, an automated teller machine, a palm top computer, and a mobile phone.

14. The method of claim 1, further comprising displaying a second user interface to the client, wherein the second user interface comprises:
   a first bar having a first dimension proportional to the actual income to the customer during a second time period; and
   a second bar having a second dimension proportional to the aggregate spending transactions by the customer during the second time period, wherein the second bar is positioned within the first bar, wherein the first dimension is parallel to the second dimension, and wherein the second time period is a historical time period.

15. A system for tracking customer spending and income, the system comprising at least one processor, wherein the at least one processor is programmed to:
   aggregate spending transactions by a customer during a first time period;
   estimate income to the customer during the first time period; and
   display a user interface to the customer, wherein the user interface comprises:

a first bar, wherein a dimension of the first bar is proportional to the estimated income to the customer during the first time period; and a second bar, wherein a dimension of the second bar is proportional to the aggregate spending transactions by the customer during the first time period, wherein the second bar is positioned within the first bar, and wherein the dimension of the first bar is parallel to the dimension of the second bar.

16. A computer readable medium having instructions thereon that when executed by at least one processor cause the at least one processor to:

aggregate spending transactions by a customer during a first time period;

estimate income to the customer during the first time period; and display a user interface to the customer, wherein the user interface comprises:

a first bar, wherein a dimension of the first bar is proportional to the estimated income to the customer during the first time period; and a second bar, wherein a dimension of the second bar is proportional to the aggregate spending transactions by the customer during the first time period, wherein the second bar is positioned within the first bar, and wherein the dimension of the first bar is parallel to the dimension of the second bar; and wherein the computer readable medium is one of a magnetic memory device and an optical memory device.

17. A computer implemented method of tracking customer spending and income, the method comprising:

aggregating spending transactions by a customer during a first time period;

estimating income to the customer during the first time period;

displaying a user interface to the customer, wherein the user interface comprises:

a first bar, wherein a dimension of the first bar is proportional to the estimated income to the customer during the first time period; and a second bar, wherein a dimension of the second bar is proportional to the aggregate spending transactions by the customer during the first time period, wherein the second bar is positioned within the first bar, and wherein the dimension of the first bar is parallel to the dimension of the second bar;

aggregating spending transactions by the customer during a second time period;

estimating income to the customer during the second time period, wherein the second time period is subsumed within the first time period; and wherein the user interface further comprises:

a third bar, wherein a dimension of the third bar is proportional to the estimated income to the customer during the second time period;

a fourth bar, wherein a dimension of the fourth bar is proportional to the aggregate spending transactions by the customer during the second time period, wherein the third bar is positioned within the fourth bar, and wherein the dimension of the third bar is parallel to the dimension of the fourth bar;

aggregating spending transactions by the customer during a third time period;

estimating income to the customer during the third time period; and wherein the user interface further comprises:

a fifth bar, wherein a dimension of the fifth bar is proportional to the estimated income to the customer during the third time period; and a sixth bar, wherein a dimension of the sixth bar is proportional to the aggregate spending transactions by the customer during the third time period, wherein the fifth bar is positioned within the sixth bar, and wherein the dimension of the fifth bar is parallel to the dimension of the sixth bar, wherein the first time period is a present week, the second time period is a present month, and the third time period is a present year.

* * * * *